Figure 1:
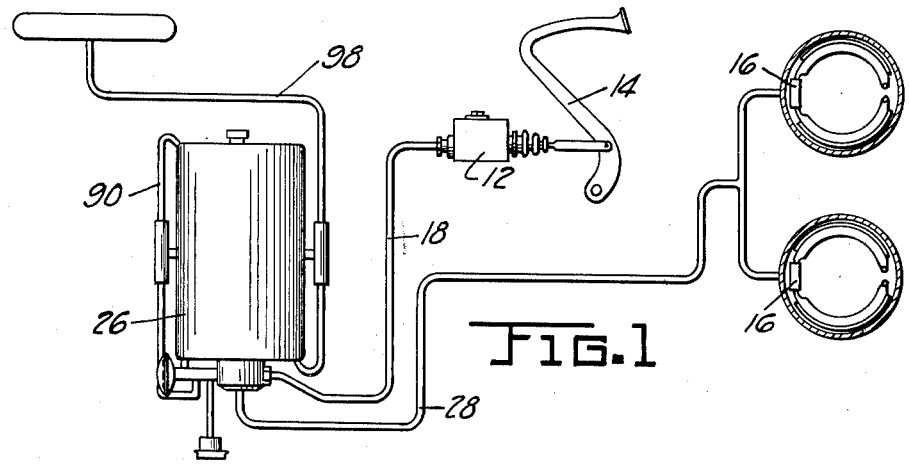

March 4, 1952  F. ADAMS  2,587,803
HYDRAULIC PRESSURE POWER DEVICE
Filed Dec. 5, 1945

INVENTOR.
FRANK ADAMS
BY
T. J. Plante
ATTORNEY

Patented Mar. 4, 1952

2,587,803

UNITED STATES PATENT OFFICE 2,587,803

HYDRAULIC PRESSURE POWER DEVICE

Frank Adams, Milwaukee, Wis., assignor to Bendix Aviation Corporation, South Bend, Ind., a corporation of Delaware Application December 5, 1945, Serial No. 632,999

5 Claims. (Cl. 60—54.5)

This invention relates to fluid pressure power systems wherein a hydraulic pressure system is operated conjointly by manually actuated means and power actuated means. More particularly, it relates to a hydraulic pressure system having a master cylinder and a motor normally in communication with one another, and having interposed in the connecting lines between said master cylinder and motor a unit comprising a differential air pressure power device and a second master cylinder which is adapted to build pressure in the motor and which itself is operated by the combined effort of the differential air pressure power device and the manually created pressure of the hydraulic liquid in the first master cylinder.

The primary object of the present invention is to provide a power unit of this type having substantially reduced overall dimensions for a given work capacity, thereby permitting the unit to be installed in a smaller space than has heretofore been possible.

In accomplishing the foregoing object, it is proposed to locate the secondary master cylinder inside the booster or power cylinder. Although superficially similar arrangements have been proposed, the present structure is the first, to my knowledge, which actually reduces the overall dimensions of the unit. Simply to place a power unit of this type inside an enlarged casing, thus giving the impression that the unit is self-contained, increases rather than decreases the dimensions of the unit. The manner in which my device accomplishes the desired result will be fully explained in the course of the following description.

Figure 2:
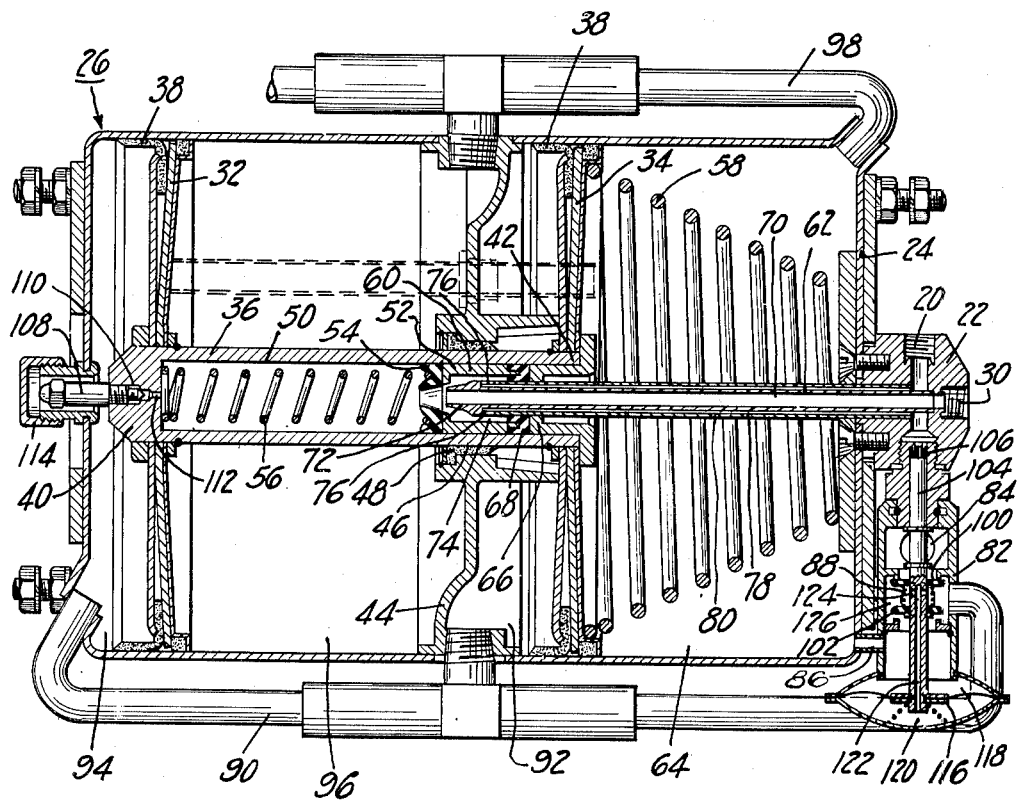

In the drawing:

Figure 1 is a diagrammatic showing of a hydraulic system in which my improved booster unit may be incorporated; and Figure 2 is a vertical section taken through the booster unit of Figure 1.

As shown in Figure 1, a master cylinder 12 may be arranged for manual actuation by means of a pedal 14. The work which is to be accomplished is performed by actuating one or more motors 16, which may operate a brake, as shown, or a clutch, or indeed any desired mechanism.

Conduit 18 connects master cylinder 12 to a port 20 provided in a casing 22 which is mounted on the front end 24 of a power cylinder or booster 26. A second conduit 28 connects a port 30, also provided in fitting 22, to the motor or motors 16.

Referring to Figure 2, it will be seen that the power cylinder 26 has two pistons 32 and 34 arranged in tandem. With a power cylinder which has only one piston, it is impossible to shorten the length of the power unit by locating the secondary master cylinder inside the power cylinder, assuming, of course, that the work output and the diameter of the power cylinder have been predetermined.

I propose to accomplish a reduction in the dimension of the power unit by the expedient of utilizing the added length required for the second piston of the tandem piston power cylinder to accommodate the secondary master cylinder, thereby obtaining a considerable reduction in diameter as compared to an equal capacity single piston power cylinder without increasing the length, and also obtaining a substantial reduction in the length of an equal capacity tandem piston power cylinder having the secondary master cylinder located outside the power cylinder. In other words, due to the utilization of tandem pistons in the power cylinder for the purpose of reducing the required diameter of the power unit, the full stroke of the secondary master cylinder can be obtained in the space which is necessary anyway for the pistons of the power cylinder.

In order to accomplish this, three units are essential—a master cylinder having a bore located inside the power cylinder, a piston reciprocable in said master cylinder, and a rod member arranged to exert force on said piston having a length at least equal to the stroke of the power cylinder. Either the rod member or the cylinder must be mounted at the end, which we shall call the forward end, of the power cylinder, extending inside said power cylinder, and the other must be mounted on the rear power cylinder piston, in such a way that the full pressure developed over both of the power cylinder pistons will act on the fluid in the secondary master cylinder, but the added length necessary to accommodate the stroke of the second power cylinder piston will also provide the stroke of the secondary master cylinder.

While the above description constitutes a delineation of the broad scope of my invention, for purposes of illustration, I shall describe with more particularity a preferred embodiment of said invention, although it is to be understood that I am claiming the invention in its broad aspects.

The two pistons 32 and 34 may, as shown, support between them the secondary master cylinder 36. Incidentally, the term "piston" is to be understood as applying to any pressure responsive movable wall, regardless whether a diaphragm arrangement is used, or a seal of the type shown in the present application, said seal being indicated as to each piston by the numeral 38. The rear portion 40 of master cylinder 36 is secured to and supported by the rearward piston 32, while the forward end 42 of master cylinder 36 is secured to and supported by the front power piston 34. The power cylinder is divided into two large chambers by means of a partition 44, each of said chambers constituting in effect a separate power cylinder. The pistons 32 and 34 are on opposite sides of partition 44, and master cylinder 36 extends through a centrally located opening 46 in partition 44, a seal 48 being provided to prevent communication between the chambers at opposite sides of said partition, while allowing master cylinder 36 to move relatively thereto. Reciprocable in the master cylinder bore 50 is a piston 52, at the front end of which is a U-section annular seal 54. A spring 56 urges piston 52 toward the forward end of the power cylinder. However, a stronger spring 58 normally retains the power cylinder pistons 32 and 34 in released position, and the provision of a spacer stem 60 on piston 52 causes said piston to be normally held in the position shown against the pressure of spring 56.

A rod 62 is supported at the front end 24 of power cylinder 26, and extends through chamber 64, which is ahead of power piston 38 and the forward end 66 of master cylinder 36, a U-section annular seal 68 being utilized to prevent the escape of liquid from the forward end of the master cylinder. The passage 70 provided through the center of hollow rod 62 comunicates through port 30 with the motor 16, and is always open at its other end to bore 50 of master cylinder 36, even though the piston 52 seats upon the inner end 72 of rod 62 after power pistons 32 and 34 have moved a short distance forward. So long as the power pistons remain in released position, the spacer stem 60 of piston 52 holds said piston away from the forward end 72 of rod 62, thereby permitting communication of fluid between master cylinder bore 50 and chamber 74, which is located between piston 52 and the forward end of master cylinder 36. Said chamber 74 is in communication through one or more ports 76 with a passage 78 which, in turn, is connected through port 20 with the primary master cylinder 12. Passages 70 and 78 are entirely separate from and independent of one another. Passage 78 may be provided by placing a tube 80 around the outside of rod 62, the inner diameter being slightly larger than the outer diameter of the rod. The entire assembly, including hollow rod 62 and tube 80 may be referred to hereinafter as a "rod member."

Valve means are provided for controlling operation of power cylinder 26 in accordance with the pressure developed in primary master cylinder 12. The valve means may comprise a casing 82 having a port 84 connected to a relatively high pressure, such as air at atmospheric pressure, a port 86 connected to chamber 64 and thence to a relatively low pressure, such as the vacuum prevailing in the intake manifold of a motor vehicle, and a port 88 connected by means of a conduit 90 to chambers 92 and 94, formed at the rear of the respective power cylinder pistons 34 and 32. Chamber 64 ahead of piston 34 and chamber 96 ahead of piston 32 are at all times connected to the lower pressure, as by the vacuum conduit 98. A valve member 100 is arranged to control communication between ports 84 and 88 in the valve device, while a valve member 102 is arranged to control communication between ports 86 and 88 in said valve device. A piston 104, having a seal 106 located on the face thereof, is subjected to the pressure prevailing in the primary master cylinder 12, for the purpose of controlling operation of the valve device.

Operation of the hydraulic system is as follows. While the pistons remain in released position, liquid from master cylinder 12 is free to communicate through passage 78 and chamber 74 with bore 50 and also with motor 16, thus providing compensation for variations in volume of the fluid due to temperature changes and other causes. When the primary master cylinder 12 is actuated by the operator, the pressure developed therein acts simultaneously in motor 16 and on piston 104. Movement of piston 104 causes valve member 102 to cut off communication between port 86 and port 88, thereby cutting off chambers 92 and 94 from the vacuum, and also causes valve member 100 to open communication between ports 84 and 88, thereby allowing air to enter chambers 92 and 94. This develops a pressure differential over the two power cylinder pistons 32 and 34, moving them toward the forward end of the power cylinder, or in other words, on their pressure stroke. The secondary master cylinder 36, of course, moves with the power cylinder pistons 32 and 34. The first portion of movement of said power cylinder pistons and said secondary master cylinder permits piston 52 to seat against the inner end 72 of rod member 62, thereby cutting off communication between the primary master cylinder 12 and motor 16. Since piston 52 will now be prevented from further movement due to the resistance of fixed rod member 62, a pressure will be built up in master cylinder bore 50 which will actuate the motor 16. Furthermore, the pressure which is created by the operator in primary master cylinder 12 will act against the annular area of the forward end 66 of secondary master cylinder 36, thereby adding physically developed force to that developed by the power cylinder pistons 32 and 34.

Once piston 52 has seated on the end of rod member 62, further movement of the power pistons and master cylinder 36 on their pressure stroke is accompanied by an increase in the volume of chamber 74, seal 68 moving toward the right with cylinder end 66. Since this chamber is in communication with primary master cylinder 12 throughout the operating stroke, the operator will be required to constantly displace additional fluid from said master cylinder 12 in order to provide a continuously increasing brake applying effort. Furthermore, a reaction against the force exerted by the operator, proportional to the brake applying effort, will be developed by pressure acting on diaphragm 116, the chamber 118 at one side of diaphragm 116 being continuously in communication with the vacuum source, whereas the chamber 120 at the opposite side of diaphragm 116 is in communication through passage 122 and ports 124 with control chamber 126 of the valve. Since the pressure conditions prevailing in chambers 94 and 92 of the power cylinder are the same as those prevailing in chamber 126 of the valve, and since chambers 96 and 64 of the power cylinder, as well as chamber 118 of the valve, are in communication with the vacuum source, a pressure differential will be developed over diaphragm 116 equal to that developed over the pistons of the power cylinder, developing a total force less than, but proportional to, the force exerted by the power cylinder pistons. This force acts through piston 104 against the fluid in line 18 and master cylinder 12, and thereby exerts a reaction force against the operator which aids in apprising him of the extent of brake application.

If the secondary master cylinder 36 were located outside the power cylinder 26, the length of the combined unit would be greater than the length of that shown in the present application by the full length of said secondary master cylinder. In the present case, the extra space required by the addition of a second power piston in tandem has been utilized to provide the secondary master cylinder stroke, without requiring a unit any longer than the power cylinder itself. Obviously, where the power cylinder has only one piston, the length of the unit cannot be varied appreciably except by varying the diameter of the unit, since the stroke requirements of the secondary master cylinder must be added to the length of the power cylinder. With the present arrangement, the space between the tandem power pistons is, in effect, taken advantage of to obtain the master cylinder stroke. This space cannot be eliminated, since each of the tandem pistons must be sufficiently far from its forward wall to permit the full piston stroke.

It will be apparent that the reduction in size of the combined power unit and master cylinder permitted by the present invention will have considerable advantage where the installation space is limited. This means that installation of a unit of this type may be permitted due to the present invention, where otherwise such installation would not have been possible.

In order to provide most satisfactory bleeding of the unit, the device may be so located that the left or rear end becomes the top, and a bleed screw 108 may be inserted in the opening 110 which communicates through passage 112 with bore 50, a removable cap 114 being screwed onto the end of the power cylinder in order that the bleeding operation may be accomplished. It will of course be understood that locating the unit in this manner does not in any way change the significance of terms referring to the forward and rear end of the structure, the term forward being used to indicate the end toward which the power cylinder pistons progress on their pressure stroke.

Although a particular embodiment of my invention has been described, it will be understood by those skilled in the art that the object of the invention may be attained by the use of constructions different in certain respects from that disclosed without departing from the underlying principles of the invention. I therefore desire by the following claims to include within the scope of my invention all such variations and modifications by which substantially the results of my invention may be obtained through the use of substantially the same or equivalent means.

I claim:

1. For use in a power and manually operated hydraulic system having a primary master cylinder controlled by the operator, a motor actuated by hydraulic pressure, and valve means operated by the pressure in said primary master cylinder; a power actuated hydraulic pressure creating device comprising a power cylinder having a partition dividing it into two chambers, said partition having a centrally located opening, two pistons arranged in tandem in said power cylinder, one in each chamber, said pistons being movable as a unit under the control of the valve means, a secondary master cylinder extending through the opening in the partition and having its rearward portion supported by the rear power cylinder piston and its forward portion supported by the forward power cylinder piston, an annular piston mounted in the bore of said secondary master cylinder, a rod member supported on the front wall of the power cylinder and extending into the forward end of said secondary master cylinder to contact said piston and thereby prevent the same from moving under the influence of pressure created in the secondary master cylinder, said rod member having two independent fluid passages extending therethrough, one of which at all times connects the motor to the interior of the secondary master cylinder through the opening in the annular piston, and the other of which connects the primary master cylinder with the chamber ahead of the annular piston, resilient means urging the piston toward the inner end of the rod member to cut off communication between the primary master cylinder and the secondary master cylinder, and means for holding the piston spaced from the inner end of the rod member when the power cylinder pistons are in released position, said power cylinder pistons moving first to allow the piston to seat on the rod and subsequently to develop pressure in the secondary master cylinder by moving it against the resistance of said piston, the pressure of the primary master cylinder acting on the annular forward wall of the secondary master cylinder to assist in developing pressure in the motor.

2. A power actuated hydraulic pressure creating device comprising a power cylinder having a partition dividing it into two chambers, said partition having a centrally located opening, two pistons arranged in tandem in said power cylinder, one in each chamber, a hydraulic cylinder extending through the opening in the partition and having its rearward portion supported by the rear power cylinder piston and its forward portion supported by the forward power cylinder piston, an annular piston mounted in the bore of said hydraulic cylinder, a rod member supported on the front wall of the power cylinder and extending into the forward end of said hydraulic cylinder to contact said piston and thereby prevent the same from moving under the influence of pressure created in the hydraulic cylinder, said rod member having two independent fluid passages extending therethrough, one of which at all times connects the interior of the hydraulic cylinder through the opening in the annular piston to a pressure actuated motor, and the other of which connects the chamber ahead of the annular piston to an operator operated master cylinder, resilient means urging the piston toward the inner end of the rod member to cut off communication between the operator operated master cylinder and said hydraulic cylinder, and means for holding the piston spaced from the inner end of the rod member when the power cylinder pistons are in released position, said power cylinder pistons moving first to allow the piston to seat on the rod and subsequently to develop pressure in the hydraulic cylinder by moving it against the resistance of said piston, the pressure of the operator operated master cylinder acting on the annular forward wall of said hydraulic cylinder to assist in developing pressure in the motor.

3. A power actuated hydraulic pressure creating device comprising a power cylinder, two pistons arranged in tandem in said power cylinder, a hydraulic cylinder having its rearward portion supported by the rear power cylinder piston and its forward portion supported by the forward power cylinder piston, an annular piston mounted in the bore of said hydraulic cylinder, a rod member supported on the front wall of the power cylinder and extending into the forward end of said hydraulic cyinder to contact said piston and thereby prevent the same from moving under the influence of pressure created in the hydraulic cylinder, said rod member having two independent fluid passages extending therethrough, one of which at all times connects the interior of the hydraulic cylinder through the opening in the annular piston to a pressure actuated motor, and the other of which connects the chamber ahead of the annular piston to an operator operated master cylinder, resilient means urging the piston toward the inner end of the rod member to cut off communication between the operator operated master cylinder and said hydraulic cylinder, and means surrounding said rod member for holding the piston spaced from the inner end of the rod member when the power cylinder pistons are in released position.

4. A power actuated hydraulic pressure creating device comprising a power cylinder having a piston therein, a hydraulic cylinder supported by the power cylinder piston, an annular piston mounted in the bore of said hydraulic cylinder, a rod member supported on the front wall of the power cylinder and extending into the forward end of said hydraulic cylinder to contact said piston and thereby prevent the same from moving under the influence of pressure created in the hydraulic cylinder, said rod member having two independent fluid passages therein, one of which at all times connects the interior of the hydraulic cylinder through the opening in the annular piston to a pressure actuated motor, and the other of which connects the chamber ahead of the annular piston to an operator operated master cylinder, resilient means urging the piston toward the inner end of the rod member to cut off communication between the operator operated master cylinder and said hydraulic cylinder, and nonresilient means for holding the piston spaced from the inner end of the rod member when the power cylinder piston is in released position.

5. A power actuated hydraulic pressure creating device comprising a power cylinder having a partition dividing it into two chambers, said partition having a centrally located opening, two pistons arranged in tandem in said power cylinder, one in each chamber, a hydraulic cylinder extending through the opening in the partition and having its rearward portion supported by the rear power cylinder piston and its forward portion supported by the forward power cylinder piston, an annular piston mounted in the bore of said hydraulic cylinder, a rod member supported on the front wall of the power cylinder and extending into the forward end of said hydraulic cylinder to contact said piston and thereby prevent the same from moving under the influence of pressure created in the hydraulic cylinder, a first passage which connectts the interior of the hydraulic cylinder to a pressure actuated motor, a second passage which connects the chamber ahead of the annular piston to an operator operated master cylinder, resilient means urging the piston toward the inner end of the rod member to cut off communication between the operator operated master cylinder and said hydraulic cylinder, and rigid means connected to said annular piston for holding the piston spaced from the inner end of the rod member when the power cylinder pistons are in released position, said power cylinder pistons moving first to allow the piston to seat on the rod and subsequently to develop pressure in the hydraulic cylinder by moving it against the resistance of said piston.

FRANK ADAMS.

REFERENCES CITED

The following references are of record in the file of this patent:

UNITED STATES PATENTS

| Number | Name | Date |
| --- | --- | --- |
| 2,020,465 | Hall | Nov. 12, 1935 |
| 2,148,273 | LaBrie | Feb. 21, 1939 |
| 2,252,482 | Gates | Aug. 12, 1941 |
| 2,260,490 | Stelzer | Oct. 28, 1941 |
| 2,272,359 | Swift | Feb. 10, 1942 |
| 2,393,524 | Fant | Jan. 22, 1946 |

FOREIGN PATENTS

| Number | Country | Date |
| --- | --- | --- |
| 329,680 | France | Feb. 24, 1903 |